(12) United States Patent
Liu (10) Patent No.: US 11,354,335 B2
(45) Date of Patent: Jun. 7, 2022

(54) METHOD AND APPARATUS FOR OBTAINING NUMBER FOR TRANSACTION-ACCESSED VARIABLE IN BLOCKCHAIN IN PARALLEL

(71) Applicant: Alipay (Hangzhou) Information Technology Co., Ltd., Zhejiang (CN)

(72) Inventor: Xiaojian Liu, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/364,013

(22) Filed: Jun. 30, 2021

(65) Prior Publication Data

US 2022/0067062 A1 Mar. 3, 2022

(30) Foreign Application Priority Data

Aug. 28, 2020 (CN) .......................... 202010889818.9

(51) Int. Cl.
| | |
|---|---|
| *G06F 16/20* | (2019.01) |
| *G06F 16/27* | (2019.01) |
| *G06F 16/23* | (2019.01) |
| *G06F 16/21* | (2019.01) |
| *G06F 9/46* | (2006.01) |
| *H04L 9/32* | (2006.01) |
| *G06Q 20/38* | (2012.01) |

(52) U.S. Cl.
CPC ............ *G06F 16/27* (2019.01); *G06F 16/219* (2019.01); *G06F 16/2365* (2019.01);
(Continued)

(58) Field of Classification Search
None
See application file for complete search history.

(56) References Cited

U.S. PATENT DOCUMENTS

| | | | |
|---|---|---|---|
| 9,858,303 B2 | 1/2018 | Bhattacharjee et al. | |
| 2017/0212781 A1* | 7/2017 | Dillenberger | ........... G06F 16/28 |

(Continued)

FOREIGN PATENT DOCUMENTS

| | | |
|---|---|---|
| CN | 102629234 A | 8/2012 |
| CN | 106095745 A | 11/2016 |

(Continued)

*Primary Examiner* — Belix M Ortiz Ditren
(74) *Attorney, Agent, or Firm* — Seed IP Law Group LLP (57) ABSTRACT

Implementations of the present specification provide a method and an apparatus for obtaining a number for a transaction-accessed variable in parallel in a blockchain. The method includes: for a first variable in a first transaction, calculating a hash value m corresponding to a variable name of the first variable, the hash value m being a value in pre-determined M values; performing the following atomic operation on an $m^{th}$ bit in a bitmap in a shared memory: reading a current first value of the $m^{th}$ bit, setting the $m^{th}$ bit to 1, and returning the first value, the bitmap having M bits, and initial values of the M bits being 0; in response to the first value being 0, obtaining a first number uniquely corresponding to the first variable, the first number being a value in pre-determined N values, and N being less than M; and setting a value of an $m^{th}$ element in a mapping array in the shared memory based on the first number, the mapping array including a total of M elements.

20 Claims, 5 Drawing Sheets

(52) U.S. Cl.
CPC .......... *G06F 9/466* (2013.01); *G06Q 20/389* (2013.01); *G06Q 20/3825* (2013.01); *G06Q 20/3827* (2013.01); *G06Q 20/3829* (2013.01); *H04L 9/3236* (2013.01); *H04L 9/3247* (2013.01); *H04L 2209/38* (2013.01)

(56) References Cited

U.S. PATENT DOCUMENTS

| | | | |
|---|---|---|---|
| 2017/0302450 A1* | 10/2017 | Ebrahimi | ............ H04L 9/3247 |
| 2018/0240062 A1 | 8/2018 | Crabtree et al. | |
| 2019/0087793 A1 | 3/2019 | Dickerson et al. | |
| 2019/0281065 A1 | 9/2019 | Xia et al. | |
| 2020/0034469 A1 | 1/2020 | Sato et al. | |
| 2020/0052884 A1 | 2/2020 | Tong et al. | |

FOREIGN PATENT DOCUMENTS

| | | | |
|---|---|---|---|
| CN | 106656974 A | 5/2017 |
| CN | 109598598 A | 4/2019 |
| CN | 110517140 A | 11/2019 |
| CN | 110535825 A | 12/2019 |
| CN | 110706101 A | 1/2020 |
| CN | 110728578 A | 1/2020 |
| CN | 111047449 A | 4/2020 |
| CN | 111475262 A | 7/2020 |
| CN | 111563093 A | 8/2020 |

* cited by examiner

METHOD AND APPARATUS FOR OBTAINING NUMBER FOR TRANSACTION-ACCESSED VARIABLE IN BLOCKCHAIN IN PARALLEL

BACKGROUND

Technical Field

Implementations of the present specification relate to the field of blockchain technologies, and more specifically, to a method and an apparatus for obtaining a number for a transaction-accessed variable in parallel in a blockchain.

Description of the Related Art

The blockchain technology is also referred to as a distributed ledger technology. Each full node in a blockchain has a full amount of consistent data. To ensure that each full node has consistent data, the premise of concurrent processing on a plurality of transactions in the blockchain is to ensure that there is no data dependency between concurrently executed transactions. For example, in the Hyperledger Fabric blockchain (briefly referred to as Fabric blockchain), an endorsement node pre-executes each transaction to generate a read-write set of each transaction, and the read-write set includes a variable read or written in a process of pre-executing a transaction. When a commit node in the Fabric blockchain enters a block, the committer node executes a transaction in the block, and determines, based on a current world state, whether a read-write set of a transaction in the block can be successfully executed, and correspondingly changes the world state if the read-write set can be successfully executed. Therefore, if there is no read-write collision between access variables of two transactions, a change in a world state caused by one transaction does not affect execution of the other transaction. Therefore, the two transactions can be executed concurrently. If there is read-write collision between access variables of two transactions, the two transactions can only be executed in series.

If variables included in a read-write set of a transaction are represented by using an original variable name (key) set, the read-write set is usually described by using a hash table to facilitate adjustment and retrieval of the read-write set. In most implementations of hash tables, locks need to be used during search and insertion. This severely affects the performance, and multi-threaded parallel access is not supported. Therefore, a more effective solution for representing access variables in transactions is required.

BRIEF SUMMARY

Implementations of the present specification provide a more effective method for obtaining a number for a transaction-accessed variable in parallel in a blockchain, which overcome shortcomings in an existing technology.

An aspect of the present specification provides a method for obtaining a number for a transaction-accessed variable in parallel in a blockchain, including: calculating a hash value m corresponding to a variable name of a first variable accessed in a first transaction, the hash value m being a value in pre-determined M values; performing the following atomic operation on an $m^{th}$ bit in a bitmap in a shared memory: reading a current first value of the $m^{th}$ bit, setting the $m^{th}$ bit to 1, and returning the first value, the bitmap having M bits, and initial values of the M bits being 0; in response to the first value being 0, obtaining a first number uniquely corresponding to the first variable, the first number being a value in pre-determined N values, and N being less than M; and setting a value of an $m^{th}$ element in a mapping array in the shared memory based on the first number, the mapping array including a total of M elements.

In an implementation, the obtaining the first number uniquely corresponding to the first variable includes performing the following atomic operation on an atomic variable: reading a current second value of the atomic variable, increasing a value of the atomic variable by 1, and returning the second value.

In an implementation, the shared memory further stores a version number variable and a version number array, the version number array includes M elements, the first transaction is a transaction in a first batch of transactions, and the method further includes: before the first batch of transactions are processed, setting a value of the version number variable to be unequal to a value of each element in the version number array; and after the storing the first number into the $m^{th}$ element in the mapping array, modifying a value of an $m^{th}$ element in the version number array to be equal to a value of the version number variable.

In an implementation, setting the value of the version number variable to be unequal to the value of each element in the version number array includes: setting the value of the version number variable to meet a pre-determined relationship with the value of each element in the version number array; and the modifying the value of the $m^{th}$ element in the version number array to be equal to the value of the version number variable includes: modifying the value of the $m^{th}$ element in the version number array based on the pre-determined relationship.

In an implementation, the shared memory further stores a version number variable, the first transaction is a transaction in a first batch of transactions, and the method further includes: before the first batch of transactions are processed, setting a value of the version number variable to be greater than a value of each element in the mapping array; where the setting the value of the $m^{th}$ element in the mapping array in the shared memory based on the first number includes: storing a sum of the first number and the value of the version number variable into the $m^{th}$ element in the mapping array.

In an implementation, the method further includes: when the first value is 1, determining whether the value of the $m^{th}$ element in the mapping array is valid; and in response to determining that the value is valid, obtaining a number for the first variable based on the value of the $m^{th}$ element in the mapping array.

In an implementation, the first transaction is a transaction in a first batch of transactions, and the method further includes: before the first batch of transactions are processed, setting a value of each element in the mapping array to a pre-determined invalid value; where the determining whether the value of the $m^{th}$ element in the mapping array is valid includes: determining whether the value of the $m^{th}$ element in the mapping array is a pre-determined invalid value.

In an implementation, the shared memory further stores a version number variable and a version number array, the version number array includes M elements, the first transaction is a transaction in a first batch of transactions, and the method further includes: before the first batch of transactions are processed, setting a value of the version number variable to be unequal to a value of each element in the version number array; where the determining whether the value of the $m^{th}$ element in the mapping array is valid includes: determining whether a value of an $m^{th}$ element in the version number array is equal to the value of the version number variable.

In an implementation, the shared memory further stores a version number variable, the first transaction is a transaction in a first batch of transactions, and the method further includes: before the first batch of transactions are processed, setting a value of the version number variable to be greater than a value of each element in the mapping array; where the determining whether the value of the $m^{th}$ element in the mapping array is valid includes: determining whether the value of the $m^{th}$ element in the mapping array is greater than or equal to the value of the version number variable.

Another aspect of the present specification provides an apparatus for obtaining a number for a transaction-accessed variable in parallel in a blockchain. The apparatus includes: a calculation unit, configured to calculate a hash value m corresponding to a variable name of a first variable accessed in a first transaction, the hash value m being a value in pre-determined M values; an atomic operation unit, configured to perform the following atomic operation on an $m^{th}$ bit in a bitmap in a shared memory: reading a current first value of the $m^{th}$ bit, setting the $m^{th}$ bit to 1, and returning the first value, the bitmap having M bits, and initial values of the M bits being 0; a first acquisition unit, configured to: in response to the first value being 0, obtain a first number uniquely corresponding to the first variable, the first number being a value in pre-determined N values, and N being less than M; and a first setting unit, configured to set a value of an $m^{th}$ element in a mapping array in the shared memory based on the first number, the mapping array including a total of M elements.

In an implementation, the first acquisition unit is further configured to perform the following atomic operation on an atomic variable: reading a current second value of the atomic variable, increasing a value of the atomic variable by 1, and returning the second value.

In an implementation, the shared memory further stores a version number variable and a version number array, the version number array includes M elements, the first transaction is a transaction in a first batch of transactions, and the apparatus further includes: a second setting unit, configured to: before the first batch of transactions are processed, set a value of the version number variable to be unequal to a value of each element in the version number array; and a modification unit, configured to: after the storing the first number into the $m^{th}$ element in the mapping array, modify a value of an $m^{th}$ element in the version number array to be equal to a value of the version number variable.

In an implementation, the second setting unit is further configured to set the value of the version number variable to meet a pre-determined relationship with the value of each element in the version number array; and the modification unit is further configured to modify the value of the $m^{th}$ element in the version number array based on the pre-determined relationship.

In an implementation, the shared memory further stores a version number variable, the first transaction is a transaction in a first batch of transactions, and the apparatus further includes: a third setting unit, configured to: before the first batch of transactions are processed, set a value of the version number variable to be greater than a value of each element in the mapping array; and the first setting unit is configured to store a sum of the first number and the value of the version number variable into the $m^{th}$ element in the mapping array.

In an implementation, the apparatus further includes: a determining unit, configured to: when the first value is 1, determine whether the value of the $m^{th}$ element in the mapping array is valid; and a second acquisition unit, configured to: in response to determining that the value is valid, obtain a number for the first variable based on the value of the $m^{th}$ element in the mapping array.

In an implementation, the first transaction is a transaction in a first batch of transactions, and the apparatus further includes: a fourth setting unit, configured to: before the first batch of transactions are processed, set a value of each element in the mapping array to a pre-determined invalid value; and the determining unit is configured to determine whether the value of the $m^{th}$ element in the mapping array is the pre-determined invalid value.

In an implementation, the shared memory further stores a version number variable and a version number array, the version number array includes M elements, the first transaction is a transaction in a first batch of transactions, and the apparatus further includes: a second setting unit, configured to: before the first batch of transactions are processed, set a value of the version number variable to be unequal to a value of each element in the version number array; and the determining unit is configured to determine whether a value of an $m^{th}$ element in the version number array is equal to the value of the version number variable.

In an implementation, the shared memory further stores a version number variable, the first transaction is a transaction in a first batch of transactions, and the apparatus further includes: a third setting unit, configured to: before the first batch of transactions are processed, set a value of the version number variable to be greater than a value of each element in the mapping array; and the determining unit is configured to determine whether the value of the $m^{th}$ element in the mapping array is greater than or equal to the value of the version number variable.

Another aspect of the present specification provides a computer readable storage medium, storing a computer program, when the computer program is executed in a computer, the computer being enabled to perform any one of the above methods.

Another aspect of the present specification provides a computing device, including a memory and a processor, the memory storing executable code, and when the processor executes the executable code, any one of the above methods being implemented.

In the solutions for obtaining a number for a transaction-accessed variable in parallel in a blockchain in the implementations of the present specification, a harsh table is replaced with the bitmap, and the bitmap is set by using atomic bit test setting instructions supported by a processor, so as to set the mapping array, so that a plurality of threads can perform insertion and retrieval on the mapping array in parallel. In this way, storage space and an assignment time can be saved, and an original variable can be referred to by a smaller number, thereby facilitating description of a read-write set in a subsequent algorithm. By invalidating a variable number based on the version number variable and the version number array, overheads of clearing the mapping array are avoided.

BRIEF DESCRIPTION OF THE SEVERAL VIEWS OF THE DRAWINGS

By describing implementations of the present specification with reference to the accompanying drawings, the implementations of the present specification can become clearer.

DESCRIPTION OF IMPLEMENTATIONS

Implementations of the present specification are described below with reference to the accompanying drawings.

Figure 1:
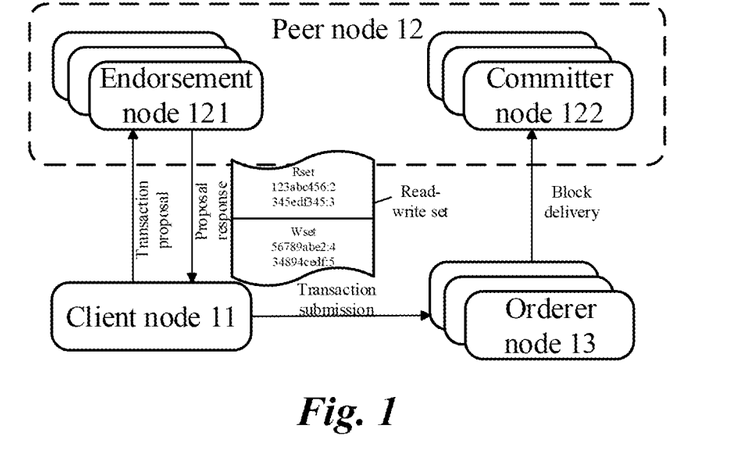
FIG. 1 is a schematic structural diagram illustrating the Fabric blockchain.

FIG. 1 is a schematic structural diagram illustrating the Fabric blockchain. Fabric blockchain is a consortium chain for enterprises. As shown in FIG. 1, the Fabric blockchain includes the following types of nodes: a client node 11, a peer node 12, an orderer node 13, and the like. The peer node 12 includes an endorsor node 121, a committer node 122, and the like. The Fabric blockchain includes a plurality of channels. Each channel has its own closed ledger data and chaincode. The chaincode is a smart contract in the Fabric blockchain. The peer node 12 can choose which channels to join. The peer node 12 can join a channel after identity verification of an existing peer node on the peer node 12 in the channel succeeds.

As shown in FIG. 1, the client node 11 can initiate a transaction proposal to a certain channel in the Fabric blockchain. Therefore, the client node 11 sends the transaction proposal to at least two endorsor nodes 121 in the channel. The endorsor node 121 in the channel has a transaction proposal system interface. By invoking the system interface, the endorsor node can pre-execute and digitally sign the transaction proposal received from the client node, and return a pre-execution result and a digital signature to the client node 11 after the pre-execution. The pre-execution result is a read-write set in a process of pre-executing the transaction. FIG. 1 shows the read-write set. The read-write set includes a read set (Rset) and a write set (Wset). The read set is a variable value read in the process of pre-executing the transaction by the endorsor node, and the variable value is recorded in a form of a key-value pair. As shown in FIG. 1, "123abc456:2" in the read set represents that the value of the variable 123abc456 (Key) is read as 2, where 123abc456 is the variable name. The write set is a value pre-written by the endorsor node for a variable in the process of pre-executing the transaction, for example, writing of the variable is merely recorded in the write set, and a world state is not changed. Similarly, the variable value is also recorded in the write set in the form of a key-value pair.

After receiving the pre-execution result and the signature of the transaction from each endorsor node 121, the client node 11 sends transaction information to the orderer node 13 to submit the transaction. The transaction information includes the transaction proposal of the transaction, the pre-execution result of the transaction, and the signature of the transaction. The orderer node 13 is configured to: sort transactions, package the sorted transactions into blocks at a fixed time interval, and send the block to each committer node 122 in the blockchain. After receiving the block, the committer node 122 executes the transaction, for example, verifies, based on the world state, whether a read-write set of each transaction in the block can be successfully executed, marks an execution status, for example, a success or a failure, of the read-write set in each transaction in the block, and then adds the block to ledger data of the node (for example, submits the block).

For example, the block includes transaction 1 and transaction 2 that are sequentially arranged, and transaction 2 is the later transaction. Transaction 2 includes reading of the variable 123abc456, and transaction 1 includes writing of the variable 123abc456. The world state is not changed during pre-execution of each transaction, for example, the value of the variable 123abc456 is not changed during pre-execution of transaction 1, but is changed after the committer node executes transaction 1. Therefore, the value that is of the variable 123abc456 and that is read during pre-execution of transaction 2 is different from the value that is of the variable 123abc456 and that is read during execution of transaction 2. In this case, the committer node 122 determines that a read-write set of transaction 2 cannot be successfully executed. As can be learned from this instance, when the same variable is recorded in the read-write sets of transaction 1 and transaction 2, it can be determined that transaction 1 and transaction 2 are likely to have a read-write collision. Therefore, transaction 1 and transaction 2 need to be executed in series in an order of transaction 1 and transaction 2. If different variables are recorded in read-write sets of two transactions, the two transactions do not have a read-write collision. In this case, the two transactions can be executed concurrently. For example, whether various transactions can be executed concurrently is determined based on whether the same variable is recorded in read-write sets of the various transactions.

As can be seen from FIG. 1, a variable name of a variable is very long, and occupies relatively large storage space. In an existing technology, the read-write set is usually described by using a hash table to facilitate adjustment and retrieval of the read-write set. An address in the harsh table is a hash value of each variable. To collect statistics about a variable collision status of each transaction, a hash value of a variable in the transaction can be calculated, and the transaction number is recorded in an address corresponding to the hash value. However, the performance of the harsh table algorithm is relatively poor, and a plurality of threads cannot access the same address in parallel.

An implementation of the present specification provides a method for assigning a number to a transaction-accessed variable in parallel. By using the method, an original variable can be referred to by a smaller number, thereby facilitating description of a read-write set in a subsequent algorithm.

Figure 2:
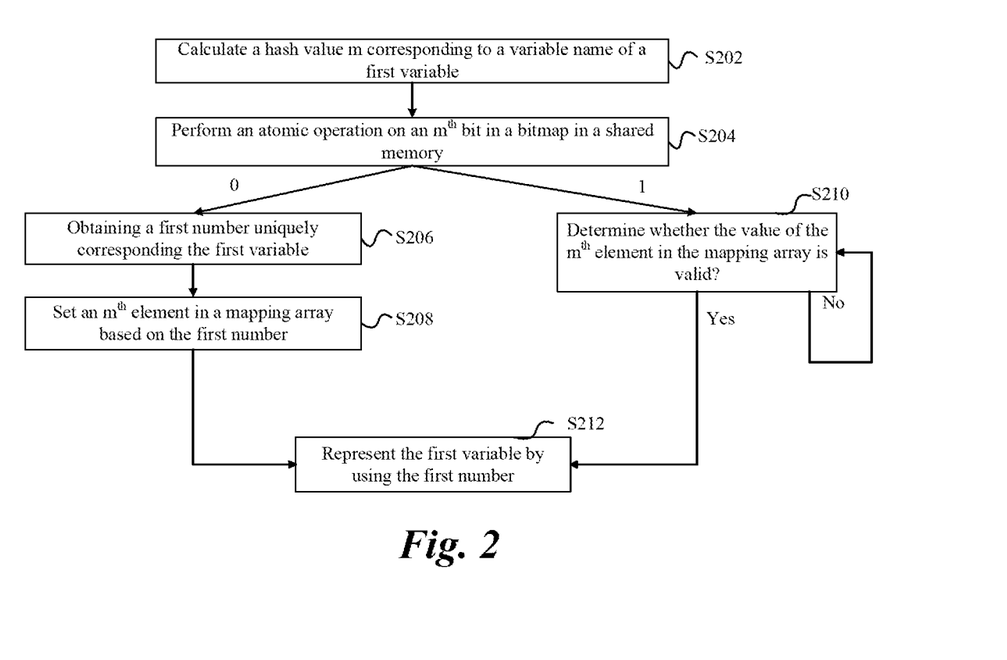
FIG. 2 is a flowchart illustrating a method for obtaining a number for a transaction-accessed variable in parallel in a blockchain according to an implementation of the present specification.

FIG. 2 is a flowchart illustrating a method for obtaining a number for a transaction-accessed variable in parallel in a blockchain according to an implementation of the present specification. The method includes the following steps:

Step S202: Calculate a hash value m corresponding to a variable name of a first variable in a first transaction, the hash value m being a value in pre-determined M values.

Step S204: Perform the following atomic operation on an $m^{th}$ bit in a bitmap in a shared memory: reading a current first value of the $m^{th}$ bit, setting the $m^{th}$ bit to 1, and returning the first value, the bitmap having M bits, and initial values of the M bits being 0.

Step S206: In response to the first value being 0, obtain a first number uniquely corresponding to the first variable, the first number being a value in pre-determined N values, and N being less than M.

Step S208: Set a value of an $m^{th}$ element in a mapping array in the shared memory based on the first number, the mapping array including a total of M elements.

Step S210: When the first value is 1, determine whether the value of the $m^{th}$ element in the mapping array is valid.

Step S212: Represent the first variable by using the first number.

The method shown in FIG. 2 is executed by one of a plurality of threads in a blockchain node device, and the plurality of threads can perform the method shown in FIG. 2 in parallel, thereby improving the efficiency of grouping a plurality of transactions. The plurality of transactions are a plurality of to-be-executed transactions, for example, are a plurality of transactions in a block in a blockchain. The plurality of transactions each have a transaction number. The transaction number is determined based on a pre-determined rule, for example, based on an amount of gas provided by the transaction, or a time sequence of a transaction proposal of the transaction. The transaction number is used to indicate a submission sequence of the transaction. For example, transaction 1 should be submitted before transaction 2.

Figure 3:
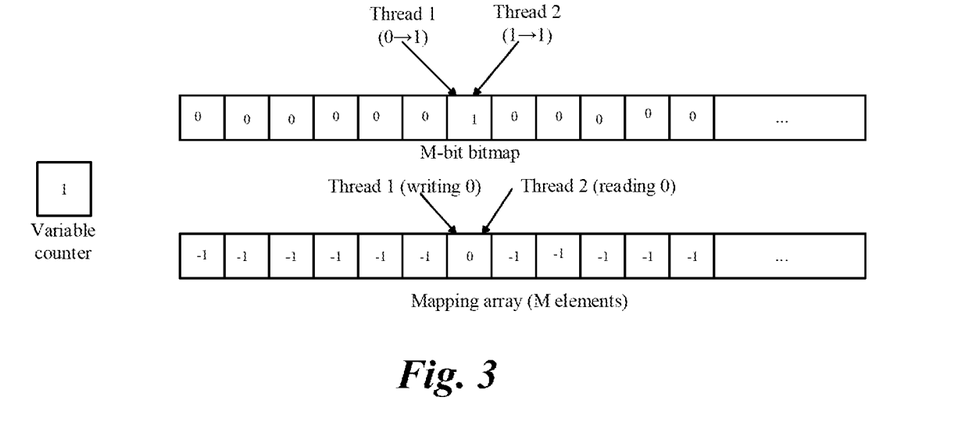
FIG. 3 is a schematic diagram illustrating a process corresponding to the method shown in FIG. 2.

FIG. 3 is a schematic diagram illustrating a process corresponding to the method shown in FIG. 2. The following provides descriptions with reference to FIG. 2 and FIG. 3.

An M-bit bitmap, a mapping array, and a variable counter that are shown in FIG. 3 all are data stored in a shared memory in a node device in a blockchain, for example, a device of a committer node in the Fabric blockchain. M corresponds to M hash values that can be mapped by a hash function. The hash function is used to convert a variable name into one of the M hash values. To avoid a hash collision, M can be set to be sufficiently large, for example, can be set to be 100000. A size of each of the M elements can be determined based on the quantity of possible accessed variables in a plurality of transactions. For example, the quantity of possible accessed variables is approximately 20000, and therefore, a size of each element can be set to be two bytes. In the node device, before the plurality of transactions (for example, a plurality of transactions in a block) are concurrently executed, each bit in the M-bit bitmap is initialized to 0, and each element in the mapping array is initialized to an invalid value (for example, −1). The variable counter in FIG. 3 is configured to generate a unique number for a variable. The variable counter is, for example, an atomic variable. The atomic variable is a basic unit of an atomic operation, and can ensure that a series of atomic operations are not interrupted, thereby ensuring the security of a thread operation. An initial value of the variable counter can be set to be, for example, 0 (for example, a number for the transaction-accessed variable starts from 0).

After the above initialization work is performed, to concurrently perform transactions, the transactions are separately obtained in the node device by using a plurality of threads, and are separately processed. FIG. 3 shows thread 1 and thread 2. It is assumed that transaction 1 is obtained by using thread 1, and transaction 2 is obtained by using thread 2. To concurrently execute a plurality of transactions, the plurality of transactions can be grouped based on access variables of the transactions. Therefore, numbers of access variables in the transactions are first obtained in parallel by using the threads, so as to group the transactions.

Method steps performed by thread 1 and thread 2 are separately described below.

For thread 1, assuming that the read-write set of transaction 1 includes the variable 123abc456, thread 1 first performs step S202 to calculate a hash value of the variable 123abc456 by using a pre-determined hash function. The pre-determined hash function can convert any character string into one of M hash values. The M hash values are, for example, 1 to M, in other words, the M hash values are in a one-to-one correspondence to M bits in the bitmap in FIG. 3, and are in a one-to-one correspondence to the M elements in the mapping array. For example, 123abc456 is converted into a hash value 6 by using the hash function.

Subsequently, thread 1 performs step S204 to perform the following atomic operation on the sixth bit in the M-bit bitmap: reading a current first value of the sixth bit, setting the sixth bit to 1, and returning the first value.

Bits in the M-bit bitmap are sequentially arranged from the zeroth bit. Therefore, as shown in FIG. 3, the sixth bit is the seventh square in the M-bit bitmap. The atomic operation is an operation that is not interrupted by a thread scheduling mechanism. Once such an operation starts, it runs to the end without changing to another thread in the middle. The above series of atomic operations are performed by, for example, the function fetch_or. The function fetch_or is used to a bitwise OR operation between an argument and a variable, and return a previous value of a read variable. Herein, parameter 1 and a position of the sixth bit in the bitmap can be passed to the function fetch_or (for example, addr and nr, where addr is a memory address, and nr is the quantity of bits). The M-bit bitmap corresponds to a plurality of atomic variables. A size of each atomic variable is, for example, a size of one byte, a word (for example, two bytes), or a long word (for example, eight bytes), so as to implement the atomic operation. When executing the function, a processor executes an atomic bit test and set instruction (atomic_test_and_set_bit) provided by hardware, and passes the parameters addr and nr to the instruction. An execution process of the instruction is: reading a corresponding atomic variable from the memory address addr, reading a value of a bit corresponding to the $(nr)^{th}$ bit of the address addr in the atomic variable, modifying the value of the bit into 1, and returning the previously read value. The instruction atomic_test_and_set_bit is an atomic instruction. During execution of the instruction, it is ensured, in a hardware form, that another processor and another thread cannot modify the value at addr (namely, the atomic variable).

It is assumed that thread 1 performs the above atomic operation before thread 2, and no other threads process the variable 123abc456 before thread 1. Therefore, as shown in FIG. 3, thread 1 executes the atomic instruction, so that it is read that the value of the sixth bit in the bitmap is 0, the sixth bit is modified into 1, and 0 is returned.

After thread 1 executes the above atomic instruction and obtains the returned value 0, it indicates that thread 1 has obtained the right to number the variable 123abc456. Therefore, thread 1 performs step S206 to obtain the number uniquely corresponding to the variable 123abc456.

Because in the node device, a plurality of threads are processing different variables in transactions in parallel, a variable counter can be arranged in a shared memory to provide ascending variable numbers. The variable counter can be an atomic variable. When each thread operates the variable counter, another thread cannot operate the variable counter, so that it can be ensured that the obtained variable number uniquely corresponds to an individual variable. For example, a current value of the variable counter is an initial value 0. Thread 1 can execute an atomic operation function fetch_add relative to the variable counter to obtain a number for the variable 123abc456. When executing the function fetch_add by using 1 as an incoming parameter, thread 1 performs the following atomic operation: reading the current value of the variable counter, increasing the value of the variable counter by 1, and returning the previously read value (e.g., 0). In other words, after performing the atomic operation, thread 1 obtains the number 0 of the variable 123abc456, and sets the value of the variable counter to 1 (as shown in FIG. 3). In addition, in the execution process, another thread or another processor cannot modify the value of the variable counter.

Subsequently, after performing step S208, thread 1 stores the number 0 of the variable 123abc456 into the sixth element in the mapping array. As shown in FIG. 3, elements in the mapping array are counted from the zeroth element. Therefore, the sixth element is the seventh square in the mapping array. For example, thread 1 writes 0 to the sixth element in the mapping array. Herein, each square represents, for example, a storage unit with two bytes. By performing the above steps, thread 1 obtains the number 0 of the variable 123abc456, and stores the number into the element corresponding to the hash value of the variable 123abc456 in the mapping array, so that each thread can search the mapping array for the number for the variable 123abc456. Subsequently, thread 1 performs step S212, that is, represents the variable 123abc456 by using the number 0.

For thread 2, assuming the read-write set of that transaction 2 also includes the variable 123abc456. Similar to thread 1, thread 2 also performs step S202 first to obtain a hash value 6 of the variable 123abc456.

Subsequently, thread 2 performs step S204 to perform the following atomic operation on the sixth bit in the M-bit bitmap: reading a current value of the sixth bit, setting the sixth bit to 1, and returning the read value.

Different from step S204 performed by thread 1, because thread 1 modifies the value of the sixth bit in the bitmap into 1 before thread 2, as shown in FIG. 3, thread 2 performs the above atomic operation to modify the value of the sixth bit in the M-bit bitmap from 1 into 1, and return 1. The returned value instructs thread 2 to perform step S210 to determine whether the value of the sixth element in the mapping array is valid.

An initial value of each element in the mapping array is initialized to, for example, an invalid value −1. In this case, if thread 1 still has not modified the value of the sixth element, the value read by thread 2 is −1; or if thread 1 has modified the value of the sixth element, the value read by thread 2 is 0.

Therefore, thread 2 first reads the value of the sixth element in the mapping array, and after reading the value of the sixth element, determines whether the value of the sixth element in the mapping array is a valid value. In response to determining that the read value is −1, that is, the value is invalid, thread 2 performs step S210 again, for example, reads the value of the sixth element again and determines whether the value is valid. In other words, thread 2 can wait in a polling way until the determined value of the sixth element becomes a valid value. When thread 2 determines that the value of the sixth element is no longer −1, that is, as shown in FIG. 3, when the value read by thread 2 from the sixth element is a valid value (that is, any value other than −1, which is 0 herein), thread 2 performs step S212 to represent the variable 123abc456 by using the read number 0.

It can be understood that the schematic diagram illustrating the process that is shown in FIG. 3 and that corresponds to the method shown in FIG. 2 is merely an example, and is not intended to limit the scope of the implementations of the present specification. The method shown in FIG. 2 can be implemented in a plurality of specific ways.

Figure 4:
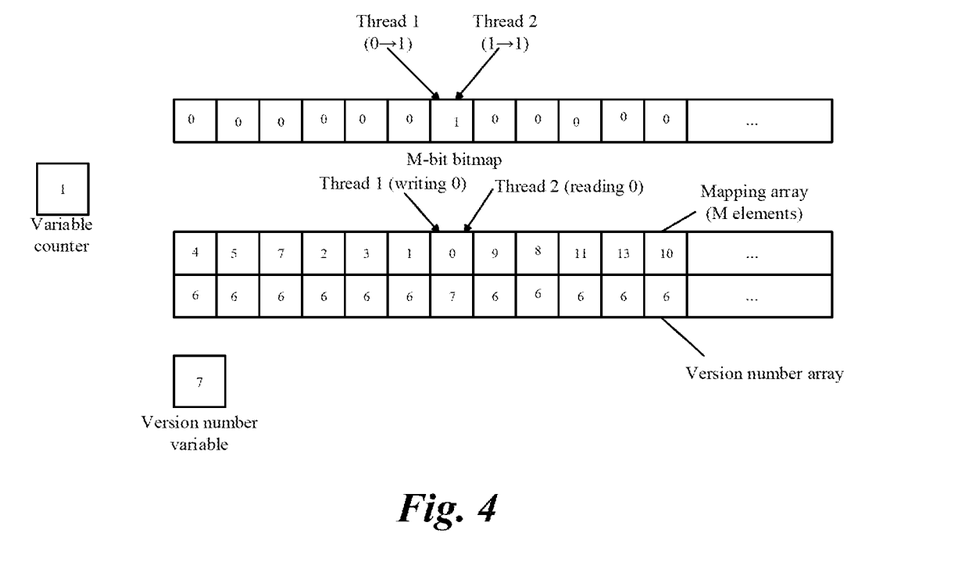
FIG. 4 is a schematic diagram illustrating a method for obtaining a number for a transaction-accessed variable in parallel in a blockchain according to an implementation of the present specification.

FIG. 4 is a schematic diagram illustrating a method for obtaining a number for a transaction-accessed variable in parallel in a blockchain according to another implementation manner of an implementation of the present specification.

As shown in FIG. 4, in the process, in addition to an M-bit bitmap, a mapping array, and a variable counter, a version number array and a version number variable are further arranged in a shared memory. The version number array also includes M elements, which are in a one-to-one correspondence to the M hash values. Assuming that numbering of all variables accessed in a plurality of transactions in the method shown in FIG. 2 is referred to as one round of variable numbering, a plurality of rounds of variable numbering can be required in a blockchain. For example, when block 1 is processed, a round of variable numbering needs to be performed to number a plurality of variables accessed in a plurality of transactions in block 1. After processing of block 1 is completed, block 2 is processed. Because variables accessed in block 2 are usually not completely the same as the variables accessed in block 1, another round of variable numbering needs to be performed to number a plurality of variables accessed in a plurality of transactions in block 2. Therefore, a version number variable can be set to record a version number for each round of variable numbering. Before the first round of variable numbering is performed, the version number variable can be set to be 0, and each element in the version number array is set to be −1. In this way, whether a value in the mapping array is a valid value can be determined by using each element in the version number array. In other words, a value of each element in the mapping array does not need to be set to be an invalid value in advance. In the process of performing the first round of variable numbering, each time after a variable is numbered, −1 in the version number array corresponding to the variable is increased by 1, that is, is modified into 0, which is the same as a current version number variable, so as to indicate that a value of a corresponding element in the mapping array is a valid value. In this way, another thread can determine, by using the value in the version number array, whether the corresponding value (that is, the number for the variable) in the mapping array is a valid value. After the first round of variable numbering is completed, and before the second round of variable numbering is completed, the value of the version number variable is increased by 1, to indicate a valid value in a mapping array in a next round of variable numbering.

It can be understood that it has been described above that a difference between the value of the version number variable and the value of each element in the current version number array is set to be 1 before a round of variable numbering is performed, so that in the variable numbering process, the value of the element in the version number array is increased by 1 to become the same as the value of the version number variable, so as to indicate that the value of the element is a valid number. The implementations of the present specification are not limited thereto. Before a round of variable numbering is performed, the value of the version number variable only needs to be modified into a value unequal to the value of the element in the current version number array. In this case, for example, after modifying the value of the sixth element in the mapping array, thread 1 can read the value of the version number variable, and modify the value of the sixth element in the version number array into the value of the version number variable. In another implementation, the value of the version number variable can be calculated based on any pre-determined rule and the value of the element in the current version number array, so that the two values have a pre-determined relationship. For example, the pre-determined rule is to multiply the value (for example, 6 shown in FIG. 4) of the element in the current version number array by 2, so that it can be calculated that a version number variable value corresponding to this round of variable numbering is 12. For example, after modifying the value of the sixth element in the mapping array, thread 1 can multiply the current value of the sixth element in the version number array by 2 to obtain 12, and modify the value of the sixth element into 12.

Through such settings, each time a next round of variable numbering is performed, neither of each element in the mapping array needs to be cleared (that is, each element is set to be an invalid value), nor does each element in the version number array need to be cleared, thereby greatly reducing workload and improving execution efficiency of a node device. For example, as shown in FIG. 4, the current version number variable is 7, which indicates that this round of variable numbering is the eighth round of variable numbering. After writing the number 0 of the variable 123abc456 to the sixth element in the mapping array, thread 1 increases the value of the sixth element in the version number array by 1, that is, modifies the value into 7, to indicate that the value "0" of the sixth element is a valid value.

Thread 2 performs step S210 after determining that the variable 123abc456 has been numbered by another thread. In the process of performing step S210, thread 2 can first read the value of the sixth element in the version number array, and determine whether the value is equal to the value of the version number variable, that is, whether the value is equal to 7. After determining that the value is 7, thread 2 reads the value of the sixth element in the mapping array as the number for the variable 123abc456. In FIG. 4, values have been recorded in, for example, the zeroth element and the first element in the mapping array, but by determining that the values of the zeroth element and the first element in the version number array are different from the value of the version number variable, it can be determined that the values of the zeroth element and the first element in the mapping array are invalid.

Figure 5:
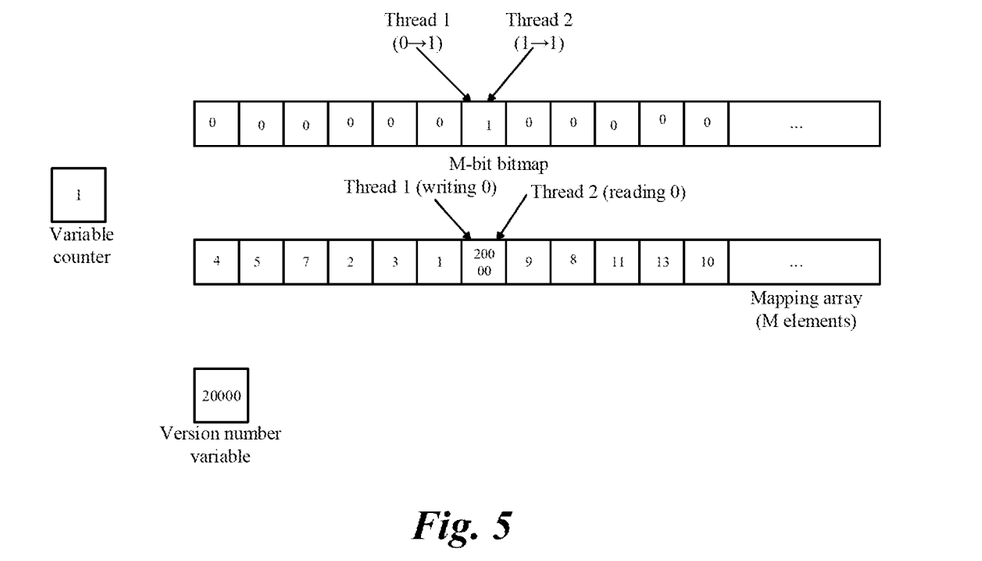
FIG. 5 is a schematic diagram illustrating a method for obtaining a number for a transaction-accessed variable in parallel in a blockchain according to another implementation manner of an implementation of the present specification.

FIG. 5 is a schematic diagram illustrating a method for obtaining a number for a transaction-accessed variable in parallel in a blockchain according to an implementation of the present specification.

As shown in FIG. 5, a shared memory stores an M-bit bitmap, a variable counter, a mapping array, and a version number variable. A main difference between the method shown in FIG. 5 and the method shown in FIG. 4 is that in FIG. 5, step S208 in FIG. 2 is performed based on the mapping array and the version number variable. For example, before the first round of variable numbering is performed, the value of each element in the mapping array can be set to be −1, and a value of the version number variable is set to be 0. After each thread obtains a number for a corresponding variable and stores the number into a corresponding element in the mapping array, the value of the element is greater than or equal to 0. Therefore, if another thread determines that a value of an element in the mapping array is greater than or equal to the value of the version number variable, the another thread can determine that the value of the element is a valid value. Before the second round of variable numbering is performed, the value of the version number variable can be set to be any value greater than the largest value in the mapping array. For example, if a total of 20000 variables are numbered in the mapping array, the largest value in the mapping array is 19999. In this case, the value of the version number variable can be set to be 20000. When obtaining a number 0 of a variable whose hash value is 6, thread 1 adds the number to the value of the version number variable to obtain a sum 20000, and stores 20000 into the sixth element in the mapping array. Another number for another variable can be processed in the same way. For example, a newly obtained number 2 can be added to 20000 to obtain a sum 20002, and 20002 is stored into a corresponding element (not shown in FIG. 5) in the mapping array. Through such settings, if another thread determines that a value of an element in the mapping array is greater than or equal to a value of a current version number variable, the another thread can determine that the value of the element is a valid value, and subtract the value of the current version number variable from the value of the element to obtain a number for a corresponding variable. For example, after reading the sixth element 20000, thread 2 determines that the value of the element is greater than or equal to the value 20000 of the version number variable, and therefore, determines that the value 20000 of the element is a valid value; and subtracts the value 20000 of the version number variable from the value 20000 of the element to obtain that the number for the variable is 0.

Through such settings, similarly, in the method shown in FIG. 4, each time a next round of variable numbering is performed, not each element in the mapping array needs to be cleared (that is, each element is set to be an invalid value), thereby greatly reducing workload and improving execution efficiency of a node device.

Figure 6:
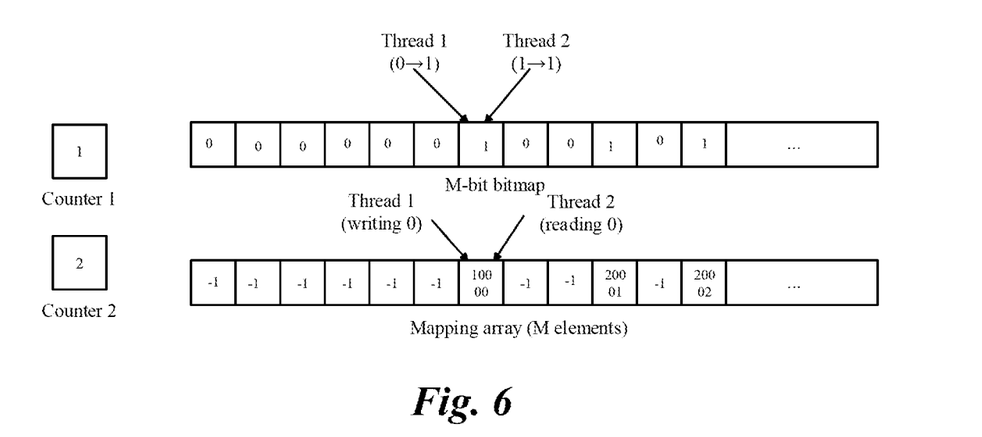
FIG. 6 is a schematic diagram illustrating a method for obtaining a number for a transaction-accessed variable in parallel in a blockchain according to another implementation manner of an implementation of the present specification.

FIG. 6 is a schematic diagram illustrating a method for obtaining a number for a transaction-accessed variable in parallel in a blockchain according to an implementation of the present specification.

As shown in FIG. 6, in the implementation, different from the implementation shown in FIG. 3, a variable counter corresponding to each thread is arranged in a shared memory, a number for variable is divided into a plurality of segments, and each segment corresponds to one thread. For example, in a node device, thread 0, thread 1, and thread 2 process a plurality of transactions, so that variable numbers 0 to 9999 can be set to correspond to thread 0, numbers 10000 to 19999 can be set to correspond to thread 1, and numbers 20000 to 29999 can be set to correspond to thread 3. FIG. 6 shows counter 1 and counter 2. Counter 1 corresponds to, for example, thread 1, and counter 2 corresponds to, for example, thread 2. Counter 1 and counter 2 are merely ordinary variables, and do not need to be atomic variables. When thread 1 performs step S206, because counter 1 corresponds only to thread 1 and is operated only by thread 1, the above atomic operation does not need to be performed, thread 1 reads a current value 0 from counter 1, increases a value in counter 1 by 1, and returns the read value 0. Subsequently, when thread 1 performs step S208, as shown in FIG. 6, thread 1 determines, based on the thread number 1 and the value of counter 1, that a number for the variable 123abc456 is: 10000+0=10000. Therefore, thread 1 writes 10000 to the sixth element in the mapping array. Similarly, when thread 2 numbers another variable, thread 2 also generates a number for the variable based on a thread number for thread 2 and a value of counter 2. For example, as shown in FIG. 6, after obtaining the right to number a variable corresponding to a hash value 9, thread 2 obtains, for example, a number 1 from counter 2, to determine that the number for the variable is: 20000+1=20001, and writes 20001 to the ninth element (the tenth square in FIG. 6) in the mapping array.

Figure 7:
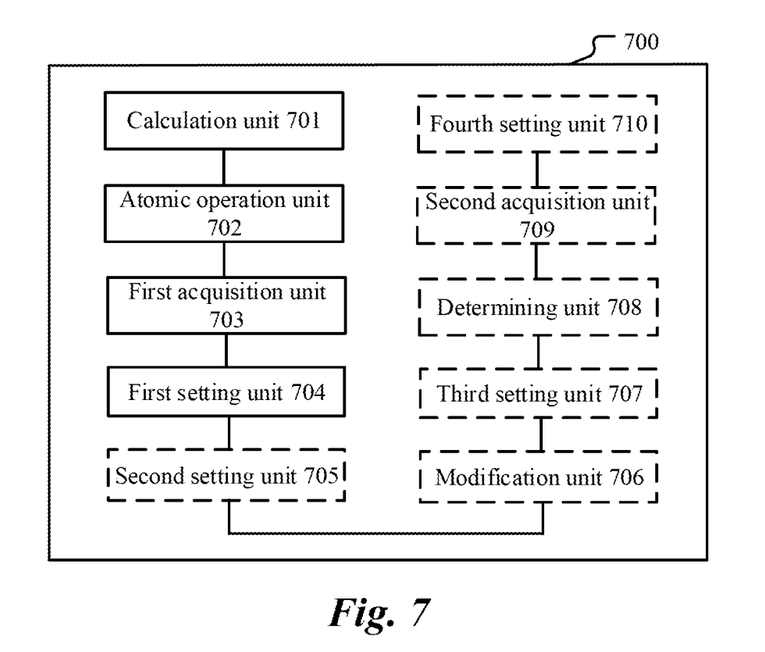
FIG. 7 shows an apparatus 700 for obtaining a number for a transaction-accessed variable in parallel in a blockchain according to an implementation of the present specification.

FIG. 7 shows an apparatus 700 for obtaining a number for a transaction-accessed variable in parallel in a blockchain according to an implementation of the present specification. The apparatus 700 includes: a calculation unit 701, configured to calculate a hash value m corresponding to a variable name of a first variable accessed in a first transaction, the hash value m being a value in pre-determined M values; an atomic operation unit 702, configured to perform the following atomic operation on an $m^{th}$ bit in a bitmap in a shared memory: reading a current first value of the $m^{th}$ bit, setting the $m^{th}$ bit to 1, and returning the first value, the bitmap having M bits, and initial values of the M bits being 0; a first acquisition unit 703, configured to: in response to the first value being 0, obtain a first number uniquely corresponding to the first variable, the first number being a value in pre-determined N values, and N being less than M; and a first setting unit 704, configured to set a value of an $m^{th}$ element in a mapping array in the shared memory based on the first number, the mapping array including a total of M elements.

In an implementation, the first acquisition unit 703 is further configured to perform the following atomic operation on an atomic variable: reading a current second value of the atomic variable, increasing a value of the atomic variable by 1, and returning the second value.

In an implementation, the shared memory further stores a version number variable and a version number array, the version number array includes M elements, the first transaction is a transaction in a first batch of transactions, and the apparatus 700 further includes: a second setting unit 705, configured to: before the first batch of transactions are processed, set a value of the version number variable to be unequal to a value of each element in the version number array; and a modification unit 706, configured to: after storing the first number into the $m^{th}$ element in the mapping array, modify a value of an $m^{th}$ element in the version number array to be equal to a value of the version number variable.

In an implementation, the second setting unit 705 is further configured to set the value of the version number variable to meet a pre-determined relationship with the value of each element in the version number array; and the modification unit 706 is further configured to modify the value of the $m^{th}$ element in the version number array based on the pre-determined relationship.

In an implementation, the shared memory further stores a version number variable, the first transaction is a transaction in a first batch of transactions, and the apparatus 700 further includes: a third setting unit 707, configured to: before the first batch of transactions are processed, set a value of the version number variable to be greater than a value of each element in the mapping array; and the first setting unit 704 is configured to store a sum of the first number and the value of the version number variable into the $m^{th}$ element in the mapping array.

In an implementation, the apparatus 700 further includes: a determining unit 708, configured to: when the first value is 1, determine whether the value of the $m^{th}$ element in the mapping array is valid; and a second acquisition unit 709, configured to: in response to determining that the value is valid, obtain a number for the first variable based on the value of the $m^{th}$ element in the mapping array.

In an implementation, the first transaction is a transaction in a first batch of transactions, and the apparatus 700 further includes: a fourth setting unit 710, configured to: before the first batch of transactions are processed, set a value of each element in the mapping array to a pre-determined invalid value; and the determining unit 708 is configured to determine whether the value of the $m^{th}$ element in the mapping array is the pre-determined invalid value.

In an implementation, the shared memory further stores a version number variable and a version number array, the version number array includes M elements, the first transaction is a transaction in a first batch of transactions, and the apparatus 700 further includes: a second setting unit 705, configured to: before the first batch of transactions are processed, set a value of the version number variable to be unequal to a value of each element in the version number array; and the determining unit 708 is configured to determine whether a value of an $m^{th}$ element in the version number array is equal to the value of the version number variable.

In an implementation, the shared memory further stores a version number variable, the first transaction is a transaction in a first batch of transactions, and the apparatus 700 further includes: a third setting unit 707, configured to: before the first batch of transactions are processed, set a value of the version number variable to be greater than a value of each element in the mapping array; and the determining unit 708 is configured to determine whether the value of the $m^{th}$ element in the mapping array is greater than or equal to the value of the version number variable.

Another aspect of the present specification provides a computer readable storage medium, storing a computer program, when the computer program is executed in a computer, the computer being enabled to perform any one of the above methods.

Another aspect of the present specification provides a computing device, including a memory and a processor, the memory storing executable code, and when the processor executes the executable code, any one of the above methods being implemented.

It can be understood that although Fabric blockchain is used as an example to describe the method for obtaining a number for a transaction-accessed variable in parallel in a blockchain, the implementations of the present specification are not limited thereto. For example, the method in the implementations of the present specification is also applicable to other types of blockchain, such as the Ethereum blockchain. For example, in the Ethereum blockchain, similarly, when executing a block, a node device in the blockchain can concurrently execute transactions accessing different variables, and needs to execute transactions accessing the same variable in series. A variable accessed in a transaction in the Ethereum blockchain is an account address related to the transaction, for example, an account address for sending the transaction or an account address referenced in the transaction. Account addresses related to various transactions are processed as variables, so that numbers corresponding to the account addresses can be obtained by using the method according to the implementations of the present specification, and the numbers are used to group the various transactions.

In the solutions for obtaining a number for a transaction-accessed variable in parallel in a blockchain in the implementations of the present specification, a harsh table is replaced with the bitmap, and the mapping array is set by using atomic bit test setting instructions supported by a processor, so that a plurality of threads can perform insertion and retrieval on the mapping array in parallel. In this way, storage space and an assignment time can be saved, and an original variable can be referred to by a smaller number, thereby facilitating description of a read-write set in a subsequent algorithm. By invalidating a variable number based on the version number variable and the version number array, overheads of clearing the mapping array are avoided. In addition, when variable names are mapped into hash values by using a hash function, if a hash value collision occurs, it is possible that two different variables are mapped into the same hash value, and therefore, the same number is assigned to different variables. In this case, when transactions are grouped based on the numbers of the variables, transactions that could have been executed in parallel are likely to be classified into one group for serial execution due to false sharing of a variable. However, this does not affect correctness of executing a transaction.

To provide further context for embodiments of this specification, and as introduced herein, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical Byzantine fault tolerance (PBFT) consensus, described in further detail below.

Figure 8:
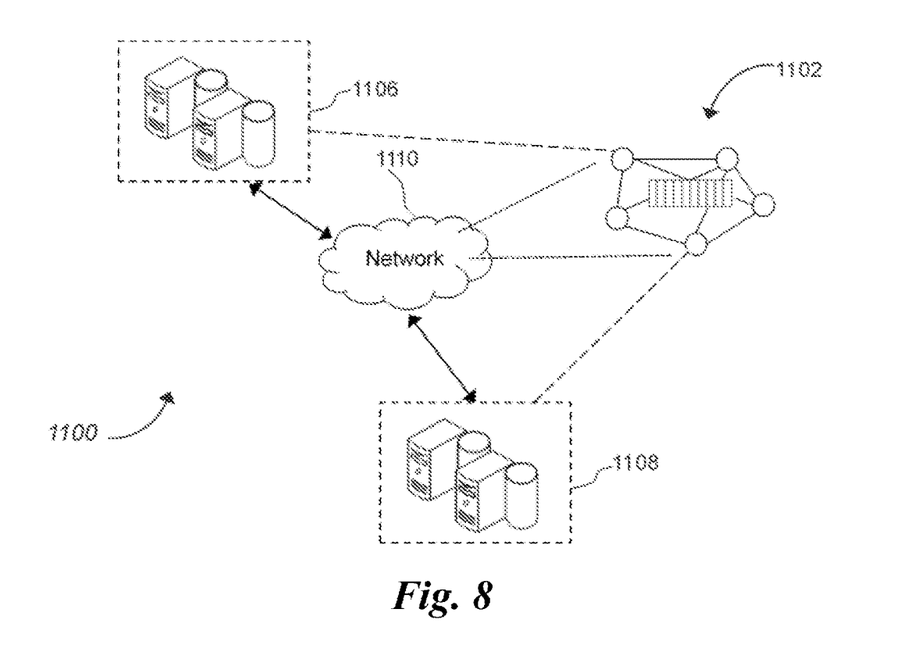
FIG. 8 is a diagram illustrating example environments that can be used to execute embodiments of this specification.

FIG. 8 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smartphone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 8, the consortium blockchain network 1102 is represented as a peer-to-peer network of nodes, and the computing systems 1106, 1108 provide nodes of the first entity and second entity, respectively, which participate in the consortium blockchain network 1102.

Figure 9:
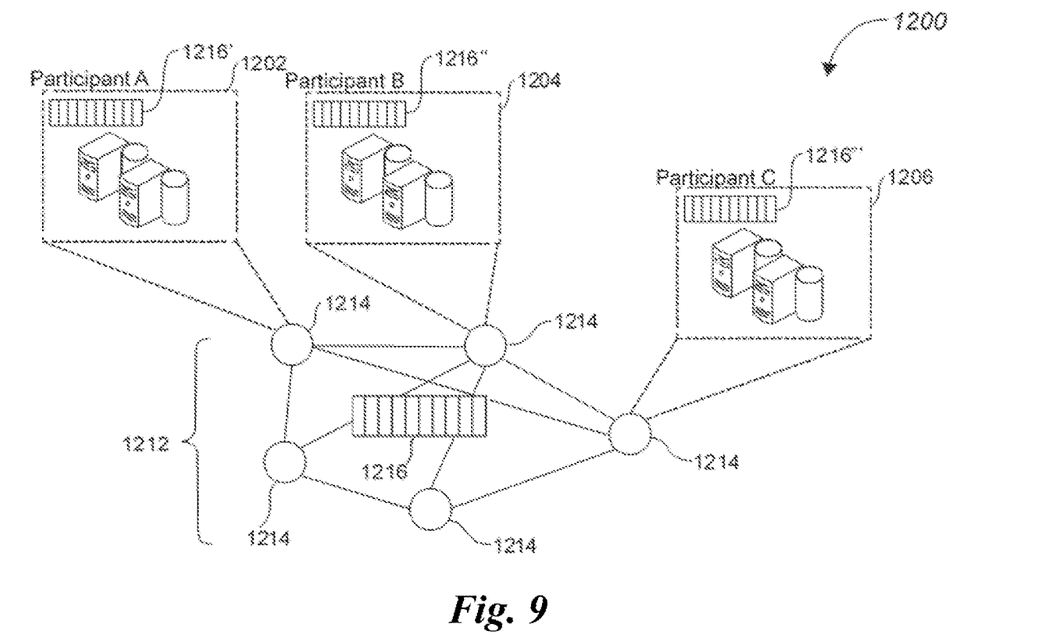
FIG. 9 is a diagram illustrating an example architecture in accordance with embodiments of this specification.

FIG. 9 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network 1212. As used herein, a node generally refers to an individual system (computer, server, etc.) that is connected to the blockchain network 1212, and enables a respective participant to participate in the blockchain network. In the example of FIG. 9, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As another example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 9, the participant systems 1202, 1204 store respective, complete copies 1216', 1216", 1216''' of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes". The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 9, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 9, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 9, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

It should be understood that descriptions such as "first" and "second" in the present specification are merely used to distinguish between similar concepts for the sake of simplicity of description, and do not constitute any limitation.

The various implementations of the present specification are described in a progressive way, and the same or similar parts between the various implementations can be referred to each other, and each implementation focuses on the differences from other implementations. Especially, because the system implementation is basically similar to the method implementation, the system implementation is described relatively simply. For a related part, reference can be made to a part of description of the method implementation.

The above describes the specific implementations of the present specification. Other implementations are within the scope of the appended claims. In some cases, the actions or steps described in the claims can be performed in an order different from that in the implementations and still can achieve desired results. In addition, the processes described in the accompanying drawings do not necessarily require the specific shown order or the sequential order to achieve the desired results. In some implementations, multitasking and parallel processing are also possible or can be advantageous.

A person of ordinary skill in the art should be further aware that the units and algorithm steps of the examples described with reference to the implementations disclosed in the present specification can be implemented by electronic hardware, computer software, or a combination of the two. To clearly illustrate the interchangeability of hardware and software, the composition and steps of each example have been described generally in terms of functions in the above descriptions. Whether these functions are executed by hardware or software depends on a specific application and design constraint of the technical solution. A person of ordinary skill in the art can use different methods for each specific application to implement the described functions, but such an implementation should not be considered as going beyond the scope of the present application. A software module can be disposed in a random access memory (RAM), an internal memory, a read-only memory (ROM), an electrically programmable ROM, an electrically erasable programmable ROM, a register, a hard disk, a removable disk, a CD-ROM, or any other form of storage medium known in the technical field.

The above specific implementations have further described the purpose, the technical solutions, and the beneficial effects of the present disclosure. It should be understood that the above is merely specific implementations of the present disclosure, and is not intended to limit the protection scope of the present disclosure. Any modification, equivalent replacement, improvement, or the like made within the spirit and the principle of the present disclosure shall be included in the protection scope of the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
calculating a hash value m corresponding to a variable name of a first variable accessed in a first transaction in a blockchain, the hash value m being a value in pre-determined M values;
performing a first atomic operation on an $m^{th}$ bit in a bitmap in a shared memory, the first atomic operation including:
reading a current first value of the $m^{th}$ bit,
setting the $m^{th}$ bit to 1, and
returning the first value, the bitmap having M bits, and initial values of the M bits being 0;
in response to the first value being 0, obtaining a first number uniquely corresponding to the first variable, the first number being a value in pre-determined N values, and N being less than M; and
setting a value of an $m^{th}$ element in a mapping array in the shared memory based on the first number, the mapping array including a total of M elements,
wherein the shared memory further stores a version number variable and a version number array, the version number array including M elements, the first transaction being a transaction in a first batch of transactions; and
wherein the method comprises:
before the first batch of transactions are processed, setting a value of the version number variable to be unequal to a value of each element in the version number array; and
after the setting the value of the mth element in the mapping, array based on the first number, modifying a value of an mth element in the version number array to be equal to a value of the version number variable.

2. The method according to claim 1, wherein the obtaining the first number uniquely corresponding to the first variable includes performing a second atomic operation on an atomic variable, the second atomic operation including:
reading a current second value of the atomic variable,
increasing a value of the atomic variable by 1, and
returning the second value.

3. The method according to claim 1, wherein
the setting the value of the version number variable to be unequal to the value of each element in the version number array includes:
setting the value of the version number variable to meet a pre-determined relationship with the value of each element in the version number array; and
the modifying the value of the $m^{th}$ element in the version number array to be equal to the value of the version number variable includes:
modifying the value of the $m^{th}$ element in the version number array based on the pre-determined relationship.

4. The method according to claim 1, further comprising:
before the first batch of transactions are processed, setting the value of the version number variable to be greater than a value of each element in the mapping array; and
wherein the setting the value of the $m^{th}$ element in the mapping array in the shared memory based on the first number includes:
storing a sum of the first number and the value of the version number variable into the $m^{th}$ element in the mapping array.

5. The method according to claim 1, comprising:
in response to the first value being 1, determining whether the value of the $m^{th}$ element in the mapping array is valid; and
in response to determining that the value of the $m^{th}$ element in the mapping array is valid, obtaining a number for the first variable based on the value of the $m^{th}$ element in the mapping array.

6. The method according to claim 5, wherein the first transaction is a transaction in a first batch of transactions, and the method comprises:
before the first batch of transactions are processed, setting a value of each element in the mapping array to be a pre-determined invalid value; and
wherein the determining whether the value of the $m^{th}$ element in the mapping array is valid includes:
determining whether the value of the $m^{th}$ element in the mapping array is a pre-determined invalid value.

7. The method according to claim 5, wherein the shared memory further stores a version number variable and a version number array, the version number array includes M elements, the first transaction is a transaction in a first batch of transactions, and the method comprises:
before the first batch of transactions are processed, setting a value of the version number variable to be unequal to a value of each element in the version number array; and
wherein the determining whether the value of the $m^{th}$ element in the mapping array is valid includes:
determining whether a value of an $m^{th}$ element in the version number array is equal to the value of the version number variable.

8. The method according to claim 5, wherein the shared memory further stores a version number variable, the first transaction is a transaction in a first batch of transactions, and the method comprises:
before the first batch of transactions are processed, setting a value of the version number variable to be greater than a value of each element in the mapping array; and
wherein the determining whether the value of the mth element in the mapping array is valid includes:
determining whether the value of the $m^{th}$ element in the mapping array is greater than or equal to the value of the version number variable.

9. A non-transitory computer readable storage medium, storing executable instructions, which when executed by a processor enable the processor to implement acts including:
calculating a hash value m corresponding to a variable name of a first variable accessed in a first transaction in a blockchain, the hash value m being a value in pre-determined M values;
performing a first atomic operation on an $m^{th}$ bit in a bitmap in a shared memory, the first atomic operation including:
reading a current first value of the $m^{th}$ bit,
setting the $m^{th}$ bit to 1, and
returning the first value, the bitmap having M bits, and initial values of the M bits being 0;
in response to the first value being 0, obtaining a first number uniquely corresponding to the first variable, the first number being a value in pre-determined N values, and N being less than M; and
setting a value of an $m^{th}$ element in a mapping array in the shared memory based on the first number, the mapping array including a total of M elements,
wherein the shared memory further stores a version number variable, the first transaction being a transaction in a first batch of transactions;

wherein the acts include, before the first batch of transactions are processed, setting a value of the version number variable to be greater than a value of each element in the mapping array; and
wherein the setting the value of the mth element in the mapping array in the shared memory based on the first number includes storing a sum of the first number and the value of the version number variable into the mth element in the mapping array.

10. A computing device, comprising a memory and a processor, the memory storing executable instructions, the executable instructions, when executed by the processor, configure the processor to implement acts including:
calculating a hash value m corresponding to a variable name of a first variable accessed in a first transaction in a blockchain, the hash value m being a value in pre-determined M values;
performing a first atomic operation on an $m^{th}$ bit in a bitmap in a shared memory, the first atomic operation including:
reading a current first value of the $m^{th}$ bit,
setting the $m^{th}$ bit to 1, and
returning the first value, the bitmap having M bits, and initial values of the M bits being 0;
in response to the first value being 0, obtaining a first number uniquely corresponding to the first variable, the first number being a value in pre-determined N values, and N being less than M; and
setting a value of an $m^{th}$ element in a mapping array in the shared memory based on the first number, the mapping array including a total of M elements,
wherein the shared memory further stores a version number variable and a version number array, the version number array including M elements, the first transaction being a transaction in a first batch of transactions; and
wherein the acts include:
before the first batch of transactions are processed, setting a value of the version number variable to be unequal to a value of each element in the version number array; and
after the setting the value of the mth element in the mapping array based on the first number, modifying a value of an mth element in the version number array to be equal to a value of the version number variable.

11. The device according to claim 10, wherein the obtaining the first number uniquely corresponding to the first variable includes performing a second atomic operation on an atomic variable, the second atomic operation including:
reading a current second value of the atomic variable,
increasing a value of the atomic variable by 1, and
returning the second value.

12. The device according to claim 10, wherein
the setting the value of the version number variable to be unequal to the value of each element in the version number array includes:
setting the value of the version number variable to meet a pre-determined relationship with the value of each element in the version number array; and
the modifying the value of the $m^{th}$ element in the version number array to be equal to the value of the version number variable includes:
modifying the value of the $m^{th}$ element in the version number array based on the pre-determined relationship.

13. The device according to claim 10, wherein the acts include:
before the first batch of transactions are processed, setting a value of the version number variable to be greater than a value of each element in the mapping array; and
wherein the setting the value of the $m^{th}$ element in the mapping array in the shared memory based on the first number includes:
storing a sum of the first number and the value of the version number variable into the $m^{th}$ element in the mapping array.

14. The device according to claim 10, wherein the acts include:
in response to the first value being 1, determining whether the value of the $m^{th}$ element in the mapping array is valid; and
in response to determining that the value of the $m^{th}$ element in the mapping array is valid, obtaining a number for the first variable based on the value of the $m^{th}$ element in the mapping array.

15. The device according to claim 14, wherein the first transaction is a transaction in a first batch of transactions, and the acts include:
before the first batch of transactions are processed, setting a value of each element in the mapping array to be a pre-determined invalid value; and
wherein the determining whether the value of the $m^{th}$ element in the mapping array is valid includes:
determining whether the value of the $m^{th}$ element in the mapping array is a pre-determined invalid value.

16. The device according to claim 14, wherein the shared memory further stores a version number variable and a version number array, the version number array includes M elements, the first transaction is a transaction in a first batch of transactions, and the acts include:
before the first batch of transactions are processed, setting a value of the version number variable to be unequal to a value of each element in the version number array; and
wherein the determining whether the value of the $m^{th}$ element in the mapping array is valid includes:
determining whether a value of an $m^{th}$ element in the version number array is equal to the value of the version number variable.

17. The device according to claim 14, wherein the shared memory further stores a version number variable, the first transaction is a transaction in a first batch of transactions, and the acts include:
before the first batch of transactions are processed, setting a value of the version number variable to be greater than a value of each element in the mapping array; and
wherein the determining whether the value of the $m^{th}$ element in the mapping array is valid includes:
determining whether the value of the $m^{th}$ element in the mapping array is greater than or equal to the value of the version number variable.

18. A method, comprising:
calculating a hash value m corresponding to a variable name of a first variable accessed in a first transaction in a blockchain, the hash value m being a value in pre-determined M values;
performing a first atomic operation on an $m^{th}$ bit in a bitmap in a shared memory, the first atomic operation including:
reading a current first value of the $m^{th}$ bit,
setting the $m^{th}$ bit to 1, and
returning the first value, the bitmap having M bits, and initial values of the M bits being 0;

in response to the first value being 0, obtaining a first number uniquely corresponding to the first variable, the first number being a value in pre-determined N values, and N being less than M; and setting a value of an $m^{th}$ element in a mapping array in the shared memory based on the first number, the mapping array including a total of M elements, wherein the shared memory further stores a version number variable, the first transaction being a transaction in a first batch of transactions;

wherein the method comprises, before the first batch of transactions are processed, setting a value of the version number variable to be greater than a value of each element in the mapping array; and wherein the setting the value of the mth element in the mapping array in the shared memory based on the first number includes storing a sum of the first number and the value of the version number variable into the mth element in the mapping array.

19. The method according to claim 18, further comprising:

before the first batch of transactions are processed, setting a value of the version number variable to be unequal to a value of each element in a version number array; and after the setting the value of the $m^{th}$ element in the mapping array based on the first number, modifying a value of an $m^{th}$ element in the version number array to be equal to a value of the version number variable.

20. The storage medium according to claim 9, wherein the acts include:

before the first batch of transactions are processed, setting a value of the version number variable to be unequal to a value of each element in the version number array; and after the setting the value of the $m^{th}$ element in the mapping array based on the first number, modifying a value of an $m^{th}$ element in the version number array to be equal to a value of the version number variable.

* * * * *

UNITED STATES PATENT AND TRADEMARK OFFICE
CERTIFICATE OF CORRECTION

PATENT NO. : 11,354,335 B2
APPLICATION NO. : 17/364013
DATED : June 7, 2022
INVENTOR(S) : Xiaojian Liu It is certified that error appears in the above-identified patent and that said Letters Patent is hereby corrected as shown below:

In the Claims

Column 21, Claim 1, Line 32:
"mth" should read: --$m^{th}$--.

Column 21, Claim 1, Line 32:
"mapping, array based" should be: --mapping array based--.

Column 21, Claim 1, Line 34:
"mth" should read: --$m^{th}$--.

Column 22, Claim 8, Line 39:
"mth" should read: --$m^{th}$--.

Column 23, Claim 9, Line 5:
"mth" should read: --$m^{th}$--.

Column 23, Claim 9, Line 8:
"mth" should read: --$m^{th}$--.

Column 23, Claim 10, Line 43:
"mth" should read: --$m^{th}$--.

Column 23, Claim 10, Line 45:
"mth" should read: --$m^{th}$--.

Column 25, Claim 18, Line 16:
"mth" should read: --$m^{th}$--.

Signed and Sealed this
Twelfth Day of March, 2024

Katherine Kelly Vidal
*Director of the United States Patent and Trademark Office*

Column 25, Claim 18, Line 19:
"mth" should read: --$m^{th}$--.